United States Patent [19]

Hindman et al.

[11] Patent Number: 4,618,431
[45] Date of Patent: Oct. 21, 1986

[54] METHOD FOR STABILIZING THE RELATIONSHIP BETWEEN THE FILTERING UNIT AND A FILTER FEED PUMP

[75] Inventors: David B. Hindman; James S. Paduchowski; Joseph D. Lima, all of Rochester, N.Y.

[73] Assignee: French Systems, Inc., Rochester, N.Y.

[21] Appl. No.: 689,818

[22] Filed: Jan. 8, 1985

[51] Int. Cl.⁴ .............................................. B01D 37/04
[52] U.S. Cl. .................................... 210/741; 210/791; 210/110; 210/111; 210/137; 210/340; 210/416.5
[58] Field of Search .............................. 210/109–111, 210/116, 137, 741, 791–793, 269, 275, 277, 333.1, 340, 416.5, 420, 427

[56] References Cited

U.S. PATENT DOCUMENTS

| | | | |
|---|---|---|---|
| 3,656,620 | 4/1972 | Larson et al. | 210/110 |
| 3,957,637 | 5/1976 | Morey | 210/137 X |
| 4,151,080 | 4/1979 | Zuckerman et al. | 210/137 X |
| 4,427,551 | 1/1984 | Dureau | 210/110 X |
| 4,469,595 | 9/1984 | Napadow | 210/111 |
| 4,487,689 | 12/1984 | Galaj | 210/137 X |

Primary Examiner—Thomas Wyse
Attorney, Agent, or Firm—Shlesinger, Fitzsimmons & Shlesinger

[57] ABSTRACT

A method of reducing the effects of fluctuating fluid pressure differential between the inlet and the outlet of a filtering unit operating in a system for filtering metal contaminants from a lubricating coolant and for recycling a constant volume flow of filtered lubricating coolant to a workpiece to be subsequently machined by pumping metal-contaminated lubricating coolant from a holding vessel to a filtering unit-modulator valve combination, monitoring the pressure or flow rate of filtered lubricating coolant downstream of the filtering unit-modulator valve combination, and operating the modulator valve in response to any changes in the downstream monitored flow parameter so as to maintain a predetermined constant fluid pressure differential across the filtering unit-modulator valve combination, thus compensating for fluctuations across the filtering unit during filtering operation, resulting in the maintenance of constant head pressure at the outlet of the pump, as well as for maintenance of a constant volume of flow of filtered lubricating coolant at a constant pressure to the workpiece to be machined.

20 Claims, 3 Drawing Figures

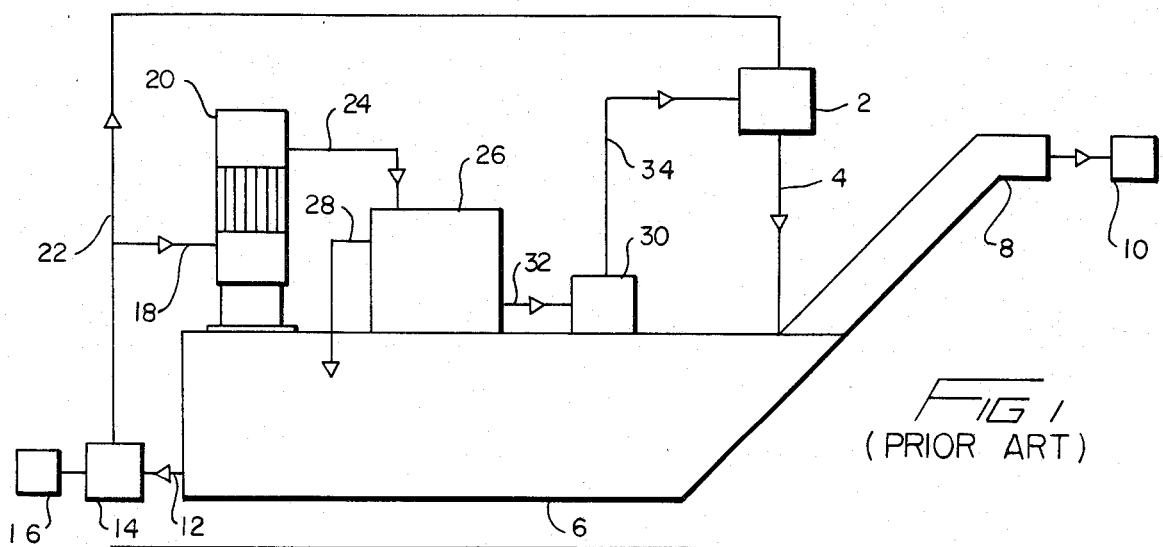
FIG 1 (PRIOR ART)
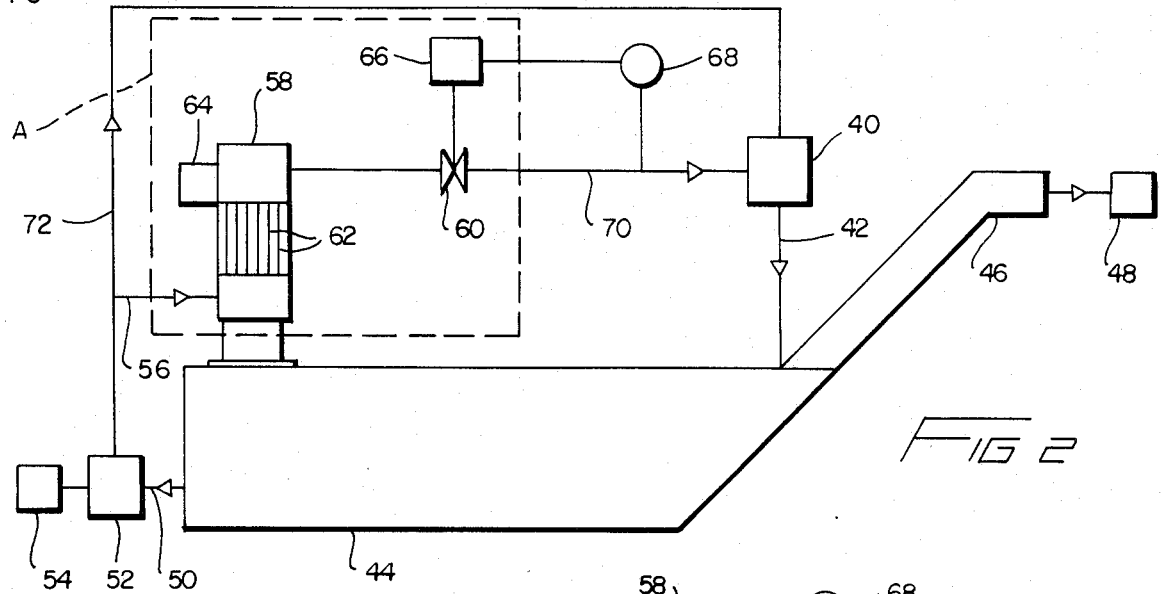
FIG 2
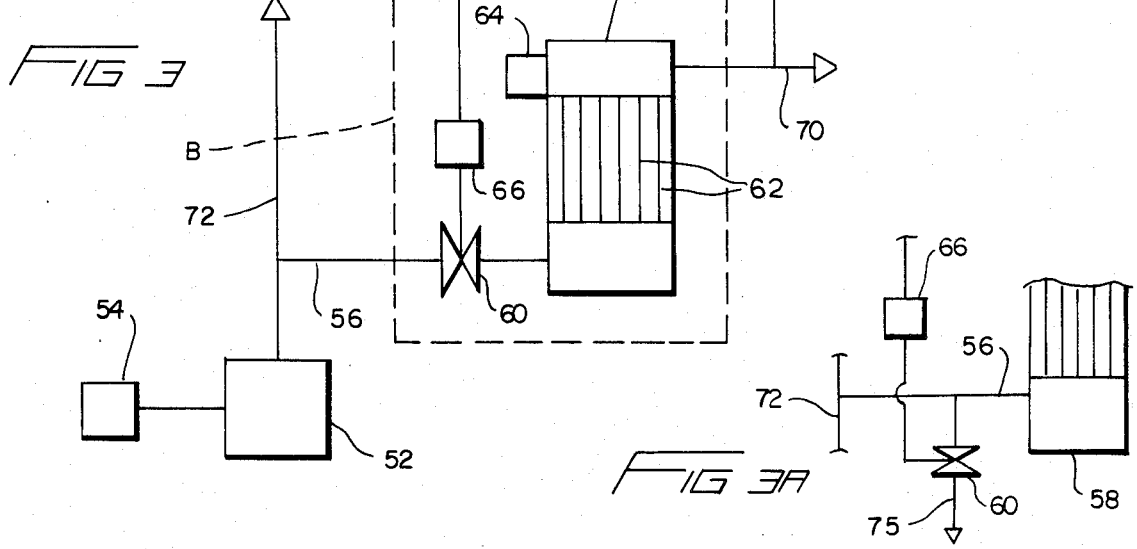
FIG 3
FIG 3A

METHOD FOR STABILIZING THE RELATIONSHIP BETWEEN THE FILTERING UNIT AND A FILTER FEED PUMP

BACKGROUND OF THE INVENTION

This invention relates to a method of filtering metal contaminants from a lubricating coolant and for recycling a constant volume of filtered lubricating coolant to a workpiece to be machined, and more particularly to a method of reducing the effects of fluctuating fluid pressure differential between the inlet and the outlet of a filter unit incorporated into such a system.

Coolant filtration systems have been employed for many years in the machine tool industry providing the essential function of servicing used, metal-contaminated lubricating coolant to remove metal contaminants therefrom and for recycling filtered lubricating coolant to the machine station for subsequent use.

At the machine station, it is critical to provide filtered lubricating coolant at preselected volume flow and pressure in order to properly cool and lubricate the tool bit as well as the workpiece which is to be machined. Any variation from the preselected values of coolant flow and pressure may result in costly damage to the machine tool, and perhaps more importantly, cause irreparable distortion of the workpiece due to excessive heat build-up. Since precision must be maintained at all times during the machining operation in order to meet demanding tolerance criteria, the necessity of providing proper lubricating coolant pressure and flow becomes readily apparent.

One typical prior art arrangement for a lubricating coolant filtration/recycling system is comprised of a contaminated coolant receiving vessel, a pump for pumping contaminated coolant from the receiving vessel, a filtration unit positioned downstream of the pump, a clean tank for receiving and accumulating filtered coolant from the filtration unit, and a clean pump positioned downstream of the clean tank for pumping the accumulated filtered coolant to the machine station.

The function of the clean tank is multifold. Primarily, it provides a reservoir of filtered coolant which the clean pump may draw from. In addition, the clean tank acts to dampen fluctuations in volume and pressure of filtered coolant exiting the filtering unit. These fluctuations are the result of pressure differential changes occuring between the inlet and the outlet of the filtration unit due to accumulation of contaminants upon the filter surfaces, as well as to changes in fluid pressure differential across the filtering unit while individual filters of the filtering unit are being serviced, for example, during backwashing.

This dampening effect causes a reduction in the occurence of fluctuations in filtered fluid volume flow and pressure when supplied by the clean pump to the machining station.

As was pointed out earlier, the provision of constant volume flow and pressure of filtered coolant at the work station is critical to the machining operation.

In addition, the clean tank must be selected so as to have a capacity to accumulate filtered coolant in excess of that required by the clean pump. The excess capacity of the clean tank varies greatly depending upon various operating parameters relating to the filtering unit as well as to the feed pump. These operating parameters will become more apparent as a result of the following discussion of the relationship between the filtering unit and the contaminated fluid feed pump.

All filtering units are designed to retain particles above a certain size. This results in a fluid pressure differential across the filtering unit, with higher pressure resulting at the inlet of the filtration unit and lower pressure resulting at the outlet of the filtration unit.

There are two major factors which affect the magnitude of the fluid pressure differential. The first is flow rate through the filter. As the flow rate through the filter increases, the fluid pressure differential increases. The second factor is contaminant loading on the filter surface. As the contaminant loading increases, the fluid pressure differential increases. However, as contaminant loading increases, flow rate decreases.

Another well known characteristic of filtering units is the relationship between fluid pressure differential and time. For example, it takes a relatively long period of time to reach a fluid pressure differential of 20 PSI as compared with the time required to go from 20 PSI to 30 PSI. Therefore, it is usually desirable to clean the filter elements somewhere in the area of this marked transition period.

The filter feed pump is typically of a centrifugal type of well known design. The benefits of this type of pump include its low initial cost, solid handling capacity as well as its relative efficiency. However, centrifugal pumps have a significant drawback in that small changes in the resistance in the discharge line (filtering unit) downstream of the pump result in large changes in the flow volume exiting the pump.

Returning now to the relationship between the filtering unit and the filter feed pump, it becomes apparent that in order to maximize the efficient use of the filtering unit, it should be allowed to reach a fluid pressure differential of, for example, 20 PSI. However, that same 20 PSI pressure differential change may cause a change in the flow rate of up to twice that required at the machining station.

Furthermore, from the minimum flow rate as required at the machining station to the maximum flow rate in the operating range of the pump, there may be far less than 20 PSI fluid pressure differential thereby reducing the effectiveness of the filtering unit.

Finally, since the size of the filtering units are based upon flow rate, if the maximum flow rate occurs at minimum fluid pressure differential, the filter may need to be twice as large as that needed for filtering only the required volume of coolant actually called for at the machining station.

SUMMARY AND OBJECTS OF THE INVENTION

This invention provides a system as well as a method for filtering contaminated lubricating coolant and recycling filtered lubricating coolant to a machine station. The invention departs from the traditional filtration/recycling systems in that it eliminates the necessity of providing a clean tank for accumulating filtered lubricating coolant and further eliminates the necessity of providing a clean fluid pump for supplying the thus accumulated filtered lubricating coolant to the machining station.

The foregoing is accomplished by providing a series or parallel connected, filtering unit-modulator valve combination downstream of the filter feed pump, and by monitoring fluid pressure or flow rate of filtered lubricating coolant downstream of the filtering unit-modulator valve combination during operation of the filtering unit in order to allow regulation of the modulator valve in response to changes in the monitored downstream flow parameter.

The modulator valve functions to maintain fluid pressure differential across the filtering unit-modulator valve combination at a constant preselected value regardless of fluctuation in fluid pressure differential across the filter unit due to contamination build-up at the filter surfaces or due to servicing of the individual filters of the filtering unit during backwashing operations. This enables a single pump to deliver filtered lubricating coolant at a constant rate and a predetermined stable pressure to a machining station.

It is therefore an object of the present invention to provide a system for filtering contaminated lubricating coolant received from a machining station and for recycling filtered lubricating coolant at a preselected flow volume and pressure to the workpiece to subsequently be machined.

It is another object of the present invention to provide a system of the above-mentioned type which eliminates the necessity of a separate clean tank and clean fluid pump downstream of the filtering unit.

A further object of the present invention is to provide a filtering/recycling system of the aforementioned type which provides for a constant head pressure at the outlet of the filter feed pump.

Still another object of the present invention is to provide a filtering/recycling system which compensates for fluid pressure differential changes between the inlet and the outlet of a filtering unit by the provision of a modulator valve placed in series with the filtering unit.

Still a further object of the present invention is to provide a filtering/recycling system of enhanced reliability and reduced cost.

The foregoing and other objects and advantages of this invention will appear from the following detailed description taken in conjunction with the accompanying drawings, in which:

FIG. 1 is a schematic drawing of a typical prior art lubricating coolant filtration and recycling system.

FIG. 2 is a schematic drawing of the preferred embodiment of the lubricating coolant filtration and recycling system of the present invention.

FIGS. 3 and 3A are schematic drawings of two alternative embodiments of the lubricating coolant filtration and recycling system of the present invention.

DETAILED DESCRIPTION OF THE DRAWINGS

Figure 1

The prior art lubricating coolant filtration and recycling system of FIG. 1 includes a workpiece machining station 2 from which used, metal-contaminated lubricating coolant is passed via conduit 4 to holding vessel 6.

Within holding vessel 6, initial separation of metal cuttings over a predetermined size takes place wherein the separated metal cuttings are discharged via conveyor means 8 to receiver 10.

Next, initially treated lubricating coolant comprising suspended metal particles is discharged from holding vessel 6 via conduit 12 by means of filter feed pump 14. Filter feed pump 14 is powered by motor 16. The lubricating coolant is discharged from pump 14 by means of conduit 18 to filtering unit 20. A portion of the unfiltered lubricating coolant discharged from pump 14 is diverted via conduit 22 and returned to machining station 2 for the purpose of washing metal cuttings away from the machining station and for transporting them to holding vessel 6.

Filtered lubricating coolant is discharged from filtering unit 20 by conduit 24 to clean tank 26. The filtered lubricating coolant accumulates within clean tank 26. However, filtered lubricating coolant in excess of that required at machining station 2 is directed back to holding vessel 6 via conduit 28.

A separate pump 30 is connected to clean tank 26 by means of conduit 32 and pumps filtered lubricating coolant via conduit 34 back to machining station 2 for subsequent reuse. The primary function of the filtration/recycling system of FIG. 1 is to provide a constant volume supply of clean lubricating coolant at a constant pressure to a machine tool being serviced thereby assuring proper lubrication and cooling of the tool bit as well as the workpiece.

Filter feed pump 14 may be of a positive displacement type or of a horizontal centrifugal type depending upon the flow volume and pressure of lubricating coolant required at machining station 2. For example, a positive displacement type pump is usually preferable for conditions requiring low flow volume and high pressure of clean lubricating coolant, while a horizontal centrifugal type pump may be preferable for conditions requiring high flow volume and low pressure of lubricating coolant.

The use of a horizontal centrifugal type pump has added advantages over the positive displacement type pump in that it is generally less expensive and may be used to handle fluids having high solid content. However, the centrifugal type pump suffers the drawback that it requires relatively constant head pressure in order to operate efficiently. Unfortunately, variations in the head pressure of pump 14 are common due to fluctuation in the fluid pressure differential across filtering unit 20 as a result of build-up of metal contaminants at the filter surfaces during operation.

Clean tank 26 functions as a reservoir for pump 30. Clean tank 26 dampens fluctuations in fluid flow volume and pressure of filtered lubricating coolant exiting from filtering unit 20. Clean tank 26 must have a holding capacity in excess of the volume of lubricating coolant required at machining station 2.

Figures 2 and 3

The lubricating coolant filtration and recycling system of FIG. 2 is comprised of machining station 40. Contaminated lubricating coolant is discharged from machining station 40 via conduit 42 to holding vessel 44.

As was the case in the prior art system, initial separation of metal contaminents over a predetermined size is conducted in holding vessel 44 whereby separated metal contaminents are discharged by conveyor means 46 to receiver 48.

Initially treated lubricating coolant is discharged from holding vessel 44 via conduit 50 by means of filter feed pump 52. Filter feed pump 52 is powered by motor 54.

Initially treated lubricating coolant is next pumped to filtering unit-modulator valve combination A via conduit 56. Filtering unit-modulator valve combination A comprises filtering unit 58 in series with modulator valve 60. Filtering unit 58 is preferably of the type comprising a plurality of individual filters 62 arranged in parallel flow relationship. Filtering unit 58 further comprises filter servicing/backwashing means 64 which may be programmed so as to disconnect individual filters from the parallel flow arrangement, backwash the disconnected filters and subsequently reinstate the filters back into the parallel flow arrangement, as disclosed for example in U.S. Pat. No. 4,482,461.

Modulator valve operation control means 66, is connected to modulator valve 60. Monitoring means 68 is positioned downstream of filtering unit-modulator valve combination A and is connected to modulator valve operation control means 66.

Filtered lubricating coolant is discharged from filtering unit-modulator valve combination A via conduit 70 whereby it is returned to machining station 40 for further use. A portion of the lubricating coolant discharge from filter feed pump 52 may be diverted through conduit 72 and returned in an unfiltered condition to machining station 40 to be used for flushing metal cuttings away from machining station 40 and for transporting them to holding vessel 44.

FIG. 3 shows an alternative embodiment of the invention wherein filtering unit-modulator valve combination B includes modulator valve 60 positioned upstream of filtering unit 58.

OPERATION

In operation, stabilization throughout the entire system is achieved by providing a filtering unit-modulator valve combination downstream of the filter feed pump.

Modulator valve 60 is automatically controlled by modulator valve operation control means 66 in response to the pressure or flow rate of filtered lubricating coolant downstream of the filtering unit-modulator valve combination as monitored by monitoring means 68. Modulator valve 60 functions to restore fluid pressure differential across the filtering unit-modulator valve combination to a predetermined value in response to fluctuations in fluid pressure differential across filtering unit 58.

Fluctuations in fluid pressure differential across filtering unit 58 are caused by accumulation of metal contaminants at the surfaces of filters 62 during operation of the unit. Fluctuations may also occur due to servicing of the individual filters by filter servicing/backwashing means 64.

Modulator valve 60 will modulate in an inverse relationship to changes in differential pressure across filtering unit 58. For example, as differential pressure across filtering unit 58 increases, modulator valve 60 will throttle open in response to a lower flow rate or pressure downstream of the filtering unit-modulator valve combination as monitored by monitoring means 68, until the monitored flow rate or pressure resumes a preselected value. Conversely, as differential pressure decreases across filtering unit 58, modulator valve 60 will throttle closed in response to greater fluid flow rate or pressure as monitored downstream of the filtering unit-modulator valve combination until the monitored flow rate or pressure again returns to normal. The net result will be a constant predetermined differential pressure across the filtering unit-modulator valve combination. Furthermore, filter feed pump 52 will be subjected to a constant head pressure thereby yielding constant volume regardless of the pressure differential across filtering unit 58. Finally, filtered lubricating coolant recycled to machining station 40 will be maintained at a constant, predetermined flow rate and pressure.

In practice, the modulating valve 60 may comprise a conventional motor-operated butterfly valve of the type sold for example, by Centerline Corp. as Series A. The control means 66 for this valve may comprise a reversible signal-responsive motor such as sold by Raymond Control Systems as model MAR, and the monitoring means 68 in such case may comprise a pressure sensing device, such as for example a capsu-photohelic switch/gauge double circuit variety of the type sold by Dwyer Instruments, Inc. of Michigan City, Ind. Alternatively, monitoring means 68 may be a flow rate measuring device such as for example a series 180 doppler flowmeter of the type sold by Controlotron of Hauppauge, N.Y.

Moreover, while the modulating valve 60 has been described as being connected in series with the filter unit 58 in FIGS. 2 and 3, it could be connected in parallel with unit 58 as shown in FIG. 3A. In this embodiment pump 52 feeds both the valve 60 and filter unit 58, and the output of valve 60 is fed by line 75 back to holding vessel 44. In such a case, of course, when the pressure drop across the filter unit increases, the valve 60 will close, and when such drop or differential decreases, valve 60 will open.

While several embodiments of the present invention have been shown and described, the embodiment of FIG. 2 is preferred since modulating valve 60 is positioned on the clean side of the filtering unit and will thus be subjected to less adverse conditions.

Additional benefits achieved by the present invention over the prior art system of FIG. 1 may be summarized as follows:

The filtering unit may be sized for the actual flow rate required at the machine station instead of the maximum flow rate of the pump as described for the prior art system.

Since constant volume flow and pressure is obtained at the outlet of the filtering unit-modulator valve combination, the machine station may be fed directly, thus eliminating the need for a clean tank and a clean supply pump.

Holding vessel 44 may be reduced in size since it will only need to handle the volume of lubricating coolant required at the machining station including flush volume.

While this invention has been described in connection with different embodiments thereof, it will be understood that it is capable of further modifications and this application is intended to cover any variations, uses or adaptations of the invention following, in general, the principals of the invention, and including such departures from the present disclosure as come within known or customary practice in the art to which the invention pertains, and as may be applied to the essential features hereinbefore set forth and followed in the scope of the invention, or the limits of the appended claims.

What I claim is:

1. A method of reducing the effects of fluctuating fluid pressure differential between the inlet and outlet of a filtering unit operating in a system for filtering metal contaminants from a lubricating coolant and for recycling a constant volume flow of filtered lubricating coolant to a workpiece to be machined, including the steps of:
   (a) providing a holding vessel for receiving metal-contaminated lubricating coolant,
   (b) collecting said metal-contaminated lubricating coolant in said holding vessel, (c) providing pumping means for pumping said contaminated lubricating coolant from said holdng vessel, (d) providing a filtering unit-modulator valve combination downstream of said pumping means, said combination including a filtering unit associated with a modulator valve, and having an outlet connected directly to a workpiece to be machined, (e) operating said pumping means to pump said metal-contaminatcd lubricating coolant at a pressure above atmospheric pressure from said holding vessel to said filtering unit-modulator valve combination, (f) filtering metal contaminants from said lubricating coolant in said filter unit, (g) monitoring the flow of filtered lubricating coolant at said outlet of said filter unit-modular valve combination, and (h) operating said modulator valve in response to any changes in the flow rate or pressure of said lubricating coolant at said outlet, thereby maintaining a predetermined constant fluid pressure differential across said filtering unit-modulator valve combination thus compensating for fluctuations across said filtering unit due to build-up of contaminants at the filter surface and further resulting in the maintenance of constant head pressure at the outlet of said pumping means and the maintenance of a constant flow rate and pressure of filtered lubicating coolant to the workpiece to be machined.

2. A method as in claim 1 including the additional steps of:

(a) providing said filter unit with a plurality of filters arranged in parallel flow relationship, (b) periodically disconnecting an individual contaminated filter from said parallel flow arrangement, (c) backwashing said disconnected filter, (d) reinstating said backwashed filter into said parallel flow arrangement, and (e) operating said modulator valve to compensate for fluid pressure differential changes across said filtering unit resulting from the disconnection from and reinstatement of said individual filter to said filtering unit during the backwashing cycle.

3. A method as in claim 1 including the additional steps of:

(a) initially treating said collected contaminated lubricating coolant by separating out metal contaminants over a predetermined size prior to pumping said lubricating fluid to said filter unit-modulator valve combination, and (b) discharging said separated metal contaminants to a separate receiver.

4. A method as in claim 1 including the additional step of:

(a) diverting a portion of said pumped, unfiltered lubricating coolant to a flushing station.

5. A method as in claim 1 including the additional step of:

(a) arranging said modulator valve downstream of said filtering unit.

6. A method as in claim 1 including the additional step of:

(a) arranging said filtering unit downstream of said modulator valve.

7. A method as in claim 1 including the additional step of:

(a) automatically operating said modulator valve.

8. A lubricating coolant filtering and recycling system comprising:

(a) a holding vessel for receiving and collecting metal-contaminated lubricating coolant from a machining station, (b) pumping means positioned downstream of said holding vessel, (c) a filtering unit-modulator valve combination comprising a modulator valve connected to a filtering unit, positioned downstream of said pumping means, and having an outlet connected directly to said machining station, (d) said pumping means being operative to pump coolant from said holding vessel to said filtering unit-modulator valve combination against a head pressure above atmospheric pressure, (e) monitoring means for monitoring the flow of filtered lubicating coolant downstream of said filtering unit-modulator valve combination adjacent the outlet thereof, and (f) modulator valve operation control means for controlling the operation of said modulator valve in response to any changes in the pressure or flow rate of said coolant downstream of said filtering unit-modulator valve combination as monitored at the outlet thereof by said monitoring means, wherein operation of said modulator valve functions to restore the fluid pressure differential across the filtering unit-modulator valve combination to a predetermined value selected according to system operating parameters in response to fluctuations in fluid pressure differential across the filtering unit due to accumulation of metal contaminants in the filtering unit, and thereby to maintain said head pressure constant.

9. A system as in claim 8 and wherein:

(a) said filtering unit includes a plurality of filters arranged in parallel flow relationship, (b) filter servicing means for disconnecting individual contaminated filters from said parallel flow arrangement and for reinstating said filters into said parallel flow arrangement, (c) backwashing means for backwashing said disconnected contaminated filters, (d) said modulator valve being activated to compensate for fluid pressure differential fluctuations across said filter unit during disconnection, backwashing and reinstatement of said individual filters thereby maintaining constant fluid pressure differential across said filtering unit-modulator valve combination.

10. A system as in claim 8 and further including:

(a) separating means associated with said holding vessel for initially separating out metal contaminants over a predetermined size from said metal-contaminated lubricating coolant prior to the pumping of said lubricating coolant to said filter unit-modulator valve combination.

11. A system as in claim 8 and further including:

(a) diverting means for diverting a portion of pumped unfiltered lubricating coolant to a flushing station.

12. A system as in claim 8 and wherein:

(a) said pumping means comprising a pump of the horizontal centrifugal type.

13. A system as in claim 8 and wherein;

(a) said pumping means comprising a pump of the positive displacement type.

14. A system as in claim 8 and wherein:

(a) said modulator valve being positioned downstream of said filtering unit.

15. A system as in claim 8 and wherein:
(a) said filtering unit being positioned downstream of said modulator valve.

16. A system as in claim 8 and wherein:
(a) said modulator valve operation control means being automatically activated.

17. A system as defined in claim 8, wherein:
(a) said modulator valve is connected in series with said filtering unit.

18. A system as defined in claim 8, wherein:
(a) said modulator valve is connected in parallel with said filtering unit, and in series with said holding vessel and said pumping means.

19. A system as defined in claim 8, wherein:
(a) said monitoring means comprises a pressure sensing device for monitoring the pressure of said lubricating coolant downstream of said combination.

20. A system as defined in claim 8, wherein:
(a) said monitoring means comprises a flow rate measuring device for measuring the rate of flow of said lubricating coolant downstream of said combination.

* * * * *